(12) United States Patent
Sabater

(10) Patent No.: US 10,926,910 B2
(45) Date of Patent: Feb. 23, 2021

(54) DEVICE AND METHOD FOR MANUALLY APPLYING A LABEL ON A PREDETERMINED OBJECT

(71) Applicant: SOCIETE BIC, Clichy (FR)

(72) Inventor: Charles J. Sabater, Barcelona (ES)

(73) Assignee: SOCIETE BIC, Clichy (FR)

( * ) Notice: Subject to any disclaimer, the term of this patent is extended or adjusted under 35 U.S.C. 154(b) by 107 days.

(21) Appl. No.: 16/462,070

(22) PCT Filed: Nov. 16, 2017

(86) PCT No.: PCT/FR2017/053135
§ 371 (c)(1),
(2) Date: May 17, 2019

(87) PCT Pub. No.: WO2018/091827
PCT Pub. Date: May 24, 2018

(65) Prior Publication Data
US 2019/0329924 A1   Oct. 31, 2019

(30) Foreign Application Priority Data

Nov. 18, 2016   (FR) ..................... 16 61215

(51) Int. Cl.
*B65C 3/10*       (2006.01)
*B65C 9/26*       (2006.01)
(Continued)

(52) U.S. Cl.
CPC ................ *B65C 9/262* (2013.01); *B65C 3/08* (2013.01); *C09J 5/00* (2013.01); *C09J 7/38* (2018.01);
(Continued)

(58) Field of Classification Search
CPC .. B65C 9/262; B65C 3/08; B65C 3/10; B65C 3/105; C09J 7/403; C09J 7/38; C09J 5/00; C09J 2203/334
See application file for complete search history.

(56) References Cited

U.S. PATENT DOCUMENTS 1,543,901 A * 6/1925 Bicknell ................. B65C 3/105
156/573
2,457,489 A * 12/1948 Pierce ..................... B65C 11/04
156/446

(Continued)

FOREIGN PATENT DOCUMENTS

DE          202004020883          5/2006

OTHER PUBLICATIONS

International Search Report dated Feb. 23, 2018 in corresponding International PCT Patent Application No. PCT/FR2017/053135, 4 pages.

*Primary Examiner* — Jeffry H Aftergut
(74) *Attorney, Agent, or Firm* — Ohlandt, Greeley, Ruggiero & Perle, L.L.P.

(57) ABSTRACT

A device for manually applying a label on a predetermined object includes a first receptacle configured to receive and hold the label and a second receptacle configured to receive and hold the object in a predetermined position in relation to the first receptacle. The second receptacle is adjacent to the first receptacle and has a window opening onto the first receptacle in such a way that it is possible to apply the label wholly or partially on the object.

10 Claims, 3 Drawing Sheets

(51) Int. Cl.
　　　*C09J 7/40*　　　(2018.01)
　　　*C09J 7/38*　　　(2018.01)
　　　*B65C 3/08*　　　(2006.01)
　　　*C09J 5/00*　　　(2006.01)

(52) U.S. Cl.
　　　CPC ................ *C09J 7/403* (2018.01); *B65C 3/10* (2013.01); *B65C 3/105* (2013.01); *C09J 2203/334* (2013.01)

(56) References Cited

U.S. PATENT DOCUMENTS

| | | |
|---|---|---|
| 2007/0227988 A1 | 10/2007 | Sabelstrom |
| 2008/0295351 A1 | 12/2008 | Borozny et al. |

\* cited by examiner

DEVICE AND METHOD FOR MANUALLY APPLYING A LABEL ON A PREDETERMINED OBJECT

CROSS-REFERENCE TO RELATED APPLICATIONS

The present Application is a National Phase Entry of International Application No. PCT/FR2017/053135, filed Nov. 16, 2017 that claims priority to French Application No. 1661215 filed on Nov. 18, 2016, the entire contents of each of which is incorporated by reference herein.

FIELD OF THE INVENTION

The invention relates to the field of devices for manually applying a label onto an object, in whole or in part, as well as a method for implementing such a device.

PRIOR ART

Automated devices for applying a label onto an object are known. Such devices generally are fully satisfactory from the viewpoint of the precision of gluing the label onto the object, as well as the output, i.e., the number of labels glued during a given period of time.

However, these known devices are designed for industrial scale production, but not for small series or unit production. Furthermore, manual application of a label onto an object is often tedious and imprecise. There is therefore a need in this sense.

SUMMARY OF THE INVENTION

The present invention relates to a device for manually applying a label onto a predetermined object.

One embodiment relates to a device for manually applying a label onto a predetermined object (the "device" hereinafter, unless otherwise indicated), comprising a first receptacle configured to receive and hold the label and a second receptacle configured to receive and hold the object in a predetermined position relative to the first receptacle, the second receptacle being adjacent to the first receptacle and having a window opening onto the first receptacle, so as to be able to apply the label in whole or in part onto the object.

It is understood that the label may be a self-stick label, but not necessarily. For example, the label may be a label with adhesive applied just before the application of the label onto the object.

It is also understood that the object is a predetermined object, but that this object may be of any type: for example, a mobile phone case, a book or notebook cover, a lighter, a pen, a razor (or the handle of a razor), a glass, a bottle, a jar, etc. The device therefore can only be used with a predetermined object, i.e., an object with a very specific shape and size. The window may cover the entire surface of the object onto which one wishes to apply the label (this surface being flat or curved), or only a part of the surface onto which one wishes to apply the label. In this latter case, it is understood that the user manually finalizes the application of the label onto an object by removing the object and the label partially glued onto the object from the device. For example, the device is configured so as to apply a label of a predetermined shape and size onto the predetermined object, but not necessarily.

The first receptacle enables the label to be received in a predetermined and reproducible position. Likewise, the second receptacle enables a predetermined object to be received in a predetermined and easily reproducible position. Thus, by means of the first receptacle and the second receptacle, the object can be easily positioned in a predetermined and reproducible position relative to the label (and vice versa).

The inventors have observed that the initial step of positioning the label relative to the object (or vice versa) and of first contact between the label and the object, is the critical step for the success of a precise and satisfactory application of a label onto an object, whatever the subsequent steps may be.

Furthermore, via the window, once the label and the object are positioned in their predetermined relative position, the label is glued directly onto the object in a precise and easily reproducible manner.

Thus, via the device, the initial step of positioning the label relative to the object (or vice versa) and of first contact between the label and the object is ensured in an easy, reproducible and satisfactory way, whatever the possible later steps of finalizing the application of the label onto the object may be.

In certain embodiments, the first receptacle comprises a base with a surface forming a support for the label, and at least one retaining element configured to limit the movement of the label relative to the surface.

It is understood that the base defines a surface forming a support on which the label is positioned before applying it onto the object. In the following, unless otherwise indicated, "surface" means "surface forming support." This surface may be curved or flat. For example, if this surface is flat, the positioning of the label is easier, and any risk of the label forming a fold is avoided. Thus, a smooth and uniform application of the label is ensured. Of course, in the case where the surface of the object onto which one wishes to apply the label is convex and the surface forming the support is flat, it is understood that the application of the label onto the object inside the device is partial, and that this application is finalized manually outside of the device.

The first receptacle comprises one or more retaining elements. Hereinafter, unless otherwise indicated, "retaining element" means "at least one retaining element." The retaining element allows the label to be placed in a predetermined position relative to the surface and limits any possible movement of the label on this surface when the label is applied onto the object. The precision and reproducibility of the application are thus ensured.

In certain embodiments, the retaining element comprises at least one stop.

It is understood that the retaining element comprises one or more stops. Hereinafter, unless otherwise indicated, "stop" means "at least one stop." Such a stop allows the label to be easily placed in a predetermined position onto the surface and this is achieved with satisfactory precision. For example, the stop is formed by a projection formed on the surface.

In certain embodiments, the first receptacle comprises at least one groove adjacent to the surface, the groove having a bottom forming an angle with the surface, the bottom forming the stop.

It is understood that the first receptacle comprises one or more grooves. Hereinafter, unless otherwise indicated, "groove" means "at least one groove." It is understood that a groove forms a retaining element.

The groove is adjacent to the surface, the bottom of the groove forming an angle with the surface. In other words, the groove is tangential to the surface and opens onto the surface. Generally, a groove has a bottom from which extend two lateral surfaces emerging onto the opening of the groove. Thus, it is understood that a lateral surface of the groove extends in the extension of the surface.

Such a groove allows for improving the retention of the label in position. In fact, not only does the groove form a stop limiting the movement of the label parallel to the surface, it also permits a blocking to some extent of the label perpendicular to the surface. The label is thus somewhat flattened against the surface. For example, this prevents the label from rolling when it is applied onto the object. Furthermore, this prevents the label from flying away if the user makes a sudden movement causing a draft. The quality of the retention and positioning of the label is thereby improved.

In certain embodiments, the surface is square or rectangular in shape, a groove being created over three sides of the square or rectangle, at the periphery of the surface.

It is therefore understood that the device comprises three grooves extending respectively on three sides of the square or rectangle, while the fourth side of the square or rectangle is open. Such a configuration permits the label to be held in at least three points. Such a hold is particularly effective and satisfactory. It is understood that only one side of the square or rectangle lacks the groove, by means of which the user may easily engage the label in the three grooves by this side that lacks a rib*. According to one variant, in order to further improve the retention of the label, the side that lacks a rib* may have a projection extending perpendicular to the surface, for example a rib parallel to the side of the square or rectangle, by means of which the label is blocked at the bottom of the groove created on the opposite side.

* sic; groove?—Translator's note

In certain embodiments, each groove is created in a wall essentially perpendicular to the surface.

"Essentially perpendicular" means that the wall forms an angle comprised between 45° and 90° with the surface. It is understood that the walls form a border on the periphery of the surface, the grooves being created in the walls, in the extension of the surface. Such a structure is robust, reliable and easy to manufacture on the device.

In certain embodiments, the second receptacle comprises two parts configured to support the object, each part being configured to cooperate via complementarity of shape with the object.

For example, if the object has a generally concave shape, the parts have convex portions so as to mate with a portion of the concave surface of the object. Such surfaces allow the object to be received in a stable and reproducible manner. Of course, it is understood that the two parts are separate while the window is arranged between these two parts.

In certain embodiments, a first wall of the three walls forms one part while the other part is formed by a bar parallel to the first wall, said bar extending from a wall adjacent to the first wall.

In other words, the first wall forms a first part while the second part is formed by the bar. It is understood that the bar extends essentially parallelly (i.e., forming an angle comprised between 0° and 45°) with the first wall. It is also understood that the bar extends between two opposite sides of the surface, but without contacting the surface, so that the label can slide between the surface (or base) and the bar. Such a structure is robust, reliable and easy to manufacture on the device.

In certain embodiments, the label is a self-stick label.

The device is particularly well suited for self-stick labels. The use of the device with such labels allows correct, fast and precise gluing to be produced under all use conditions.

In certain embodiments, the self-stick label has two separate removable protections protecting the sticky surface of the label, one of the protections being of the same shape as the window and having a surface area comprised between 80% and 120% of the surface area of the window.

Using such labels, it is possible to first remove the protection facing the window, which allows the label to be applied onto the object, without the risk of the sticky part of the label that is not opposite the window being contaminated or forming folds. Once the label is partially affixed onto the object, the assembly is removed from the device, and then the second protection is removed to finalize the application of the label. Furthermore, the shape and surface area of the protection permit minimizing the risk that the sticky surface of the label exposed when the protection is removed will stick inadvertently onto the device, for example onto the bar, when the label is inserted into or removed from the device. Such a configuration permits producing a particularly correct, fast and precise gluing under the use conditions.

In certain embodiments, the object is cylindrical.

It is recalled that a cylinder is a surface resulting from the meeting of all straight lines having the same direction and intersecting a given curve. The straight lines are called generatrices of the cylinder, and the curve is called the directrix of the cylinder. Thus, the cylinder may have a transverse section of any shape: polygonal, curved, ovoid, elliptical, circular, etc.

The device is particularly well suited for applying a label onto a cylindrical object, such as a pen or a lighter, notably a lighter with an elliptical section. Using the device, the label is applied onto a part of the cylindrical object, and then the object is removed from the device, the label being partially glued onto the object, and finally the object is rolled onto the rest of the label to complete the application of the label. Since the positioning and preliminary gluing of the label onto the object are perfectly produced thanks to the device, finalizing the application of the label becomes a particularly simple operation.

In certain embodiments, the second housing is configured to receive the object so that the axis of the cylindrical shape of the object is parallel to two grooves and perpendicular to the third groove, the second receptacle being open on the side of the surface lacking a groove.

It is therefore understood that the walls defining the second receptacle form a slide receiving the object, the slide being open on the side of the surface lacking a groove. It is also understood that the label is glued onto the cylindrical surface of the object. The object and the label glued onto the object can therefore be easily removed by sliding the object in the slide formed by the second receptacle, from the open side of the second receptacle. Such a movement is therefore parallel to the axis of the cylindrical shape of the object. The object thus entrains the glued label onto the cylindrical surface of the object, by releasing it from the grooves. The grooves obviously help guide the label when the object is removed from the device.

This disclosure also relates to a method for manually applying a label onto a predetermined object.

One embodiment relates to a method for manually applying a label onto a predetermined object, comprising the steps of providing a device according to any embodiment described in this disclosure, arranging a label in the first receptacle so that a sticky part of the label is positioned opposite the window of the second receptacle, arranging the object in the second receptacle, by means of which the sticky part is glued onto the object, removing the object and the label from the device, and gluing the rest of the label onto the object.

BRIEF DESCRIPTION OF THE DRAWINGS

The invention and its advantages will be better understood on reading the detailed description below of different embodiments of the invention given by way of non-limiting examples. This description refers to the appended figure pages, in which.

DETAILED DESCRIPTION OF EXAMPLES OF EMBODIMENT

Figure 1:
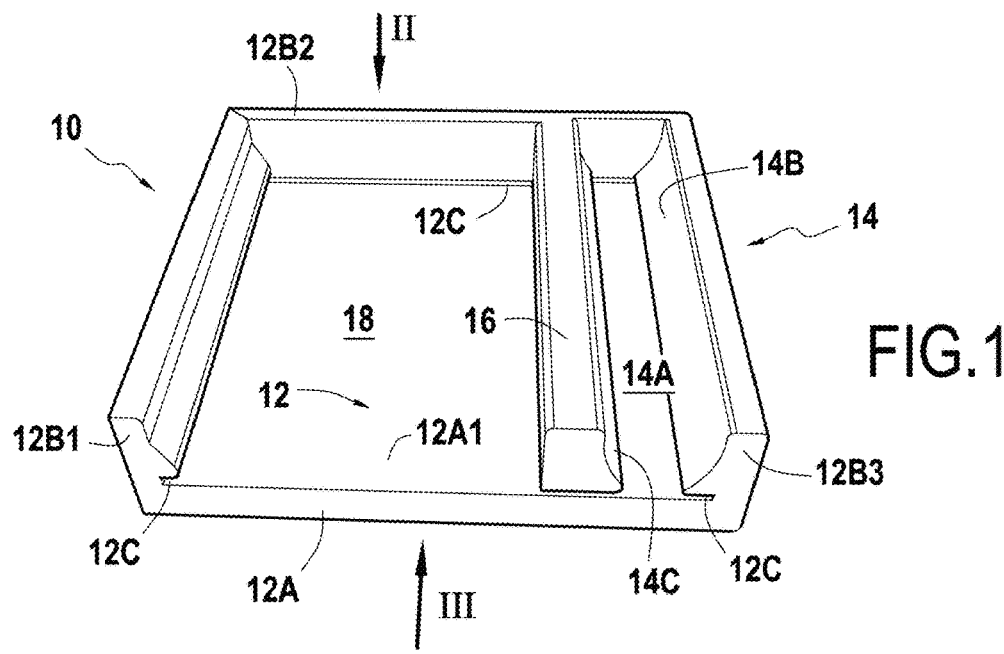
FIG. 1 shows a device for manually applying a label onto a predetermined object, viewed in perspective.
Figure 2:
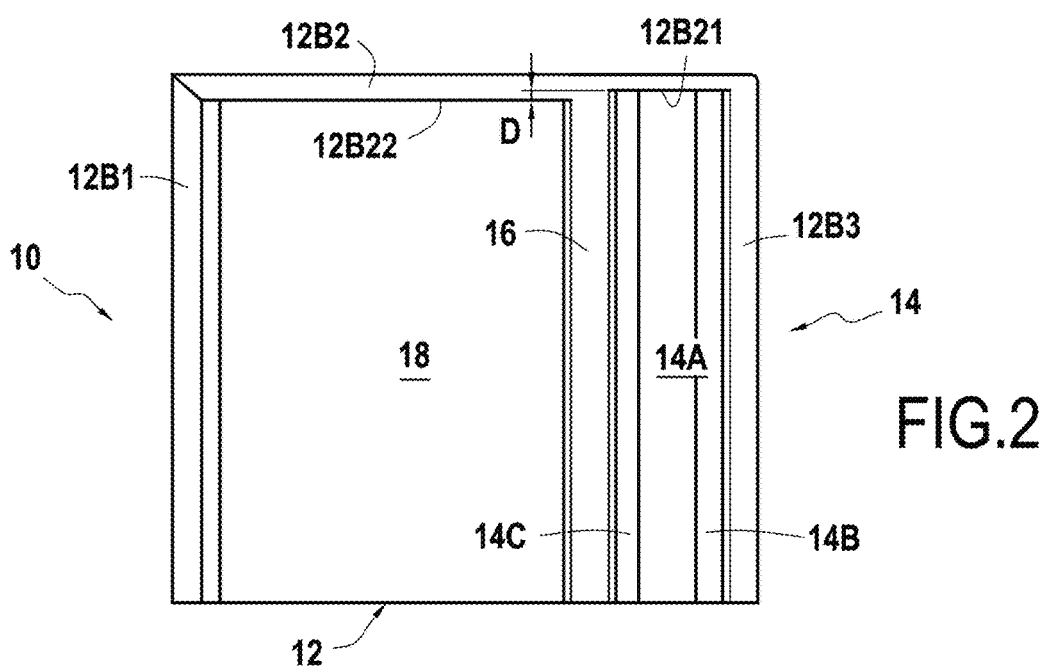
FIG. 2 shows the device of FIG. 1, viewed along arrow II.
Figure 3:
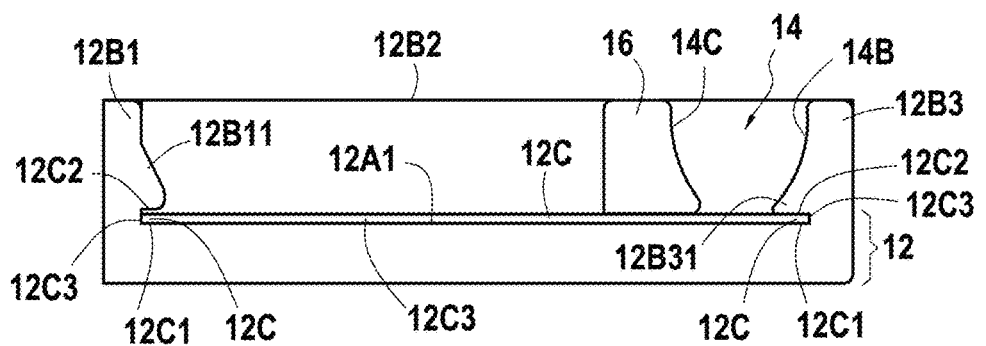
FIG. 3 shows the device of FIG. 1, viewed along arrow III.

A device for manually applying a label onto a predetermined object is described in reference to FIGS. 1 to 3.

The device for manually applying a label onto a predetermined object comprises a first receptacle 12 configured to receive and hold a label. Device 10 also comprises a second receptacle 14 configured to receive a predetermined object 20 in a predetermined position relative to first receptacle 12. In this example, the predetermined object is a lighter 50, of cylindrical shape and elliptical transverse section (see FIG. 5A). Of course, this example is not limited to a lighter and is applicable to any other object.

The first receptacle 12 also comprises a base 12A with a square surface 12A1, this surface 12A1 forming a support for label 60. Three walls 12B1, 12B2 and 12B3 extend over the periphery of base 12A, perpendicular to surface 12A1. Of course, all three of these walls 12B1, 12B2 and 12B3 extend on the same side relative to base 12A. In this example, the three walls 12B1, 12B2 and 12B3 are contiguous and form a continuous border at the periphery of surface 12A1. According to one variant, the three walls may, naturally, be distant from one another and form a discontinuous border over three sides of surface 12A1.

Figure 4:
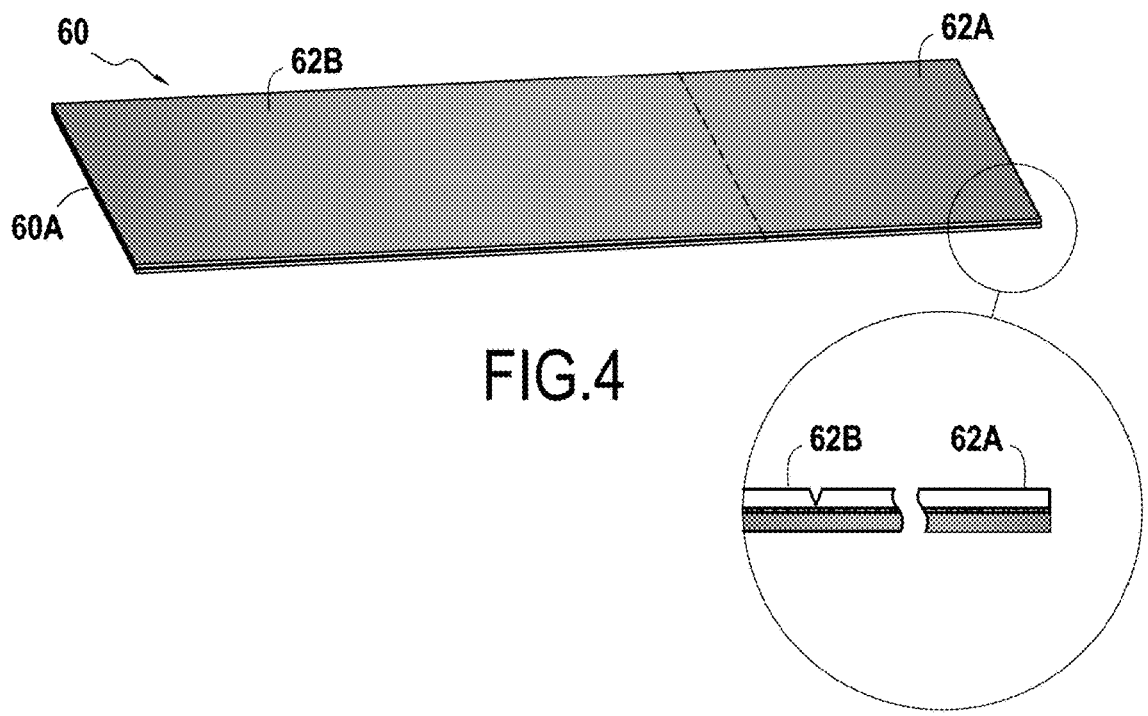
FIG. 4 shows a self-stick label comprising two removable protections.

The base of each of walls 12B1, 12B2 and 12B3 has a groove 12C configured to receive a label, and more particularly, the border 60A of a label 60 as shown in FIG. 4. Each groove 12C is adjacent and tangential to surface 12A1 and opens onto surface 12A1.

More particularly, in this example, walls 12B1 and 12B3 form lateral walls positioned face to face on opposite sides of surface 12A1, while wall 12B2 forms an intermediate wall extending between walls 12B1 and 12B3 on one side of surface 12A1. Thus, wall 12B2 is adjacent to lateral walls 12B1 and 12B3 and extends perpendicular to walls 12B1 and 12B3.

More particularly, in this example, groove 12C of each wall comprises a first lateral surface 12C1 extending in the extension of surface 12A1 and positioned facing a second lateral surface 12C2. A bottom surface 12C3, or bottom 12C3, of each groove 12C forms a continuous stop configured to limit the movement of a label 60. In this example, bottom 12C3 is perpendicular to surface 12A1. Thus, generally, each groove 12C forms a retaining element configured to limit the movement of label 60 on surface 12A1.

In this example, the second lateral surface 12C2 of groove 12C of wall 12B1 is formed by a spoiler 12B11 extending over the entire length of wall 12B1. Similarly, the second lateral surface 12C2 of groove 12C of wall 12B3 is formed by a spoiler 12B31 described in more detail below, spoiler 12B31 extending over the entire length of wall 12B3. Wall 12B2 in this example does not have a spoiler but has a constant thickness along the direction perpendicular to surface 12A1, groove 12C of this wall 12B2 being formed in this constant thickness. In this example, spoiler 12B11 is different and independent from 12B31. According to one variant, groove 12C of lateral wall 12B1 is similar to the groove of intermediate wall 12B2.

Second receptacle 14 comprises a first part formed by lateral wall 12B3, and a second part formed by a bar 16, these first and second parts being configured to cooperate by complementarity of shape with a lighter 50. A window 14A opening onto first receptacle 12 is formed between the first part and the second part. Note that the retention of the label by bar 16 is particularly effective. Thus, groove 12C formed under spoiler 12B31 is optional, so that according to one variant, no groove is formed between spoiler 12B31 and surface 12A1.

Spoiler 12B31 has a concave surface 14B configured to mate with the shape of a part of lighter 50. This surface 14B is disposed opposite lateral surface 12C3 of groove 12C of wall 12B3.

Bar 16 extends perpendicularly to and starting from intermediate wall 12B2. Bar 16 is distant from surface 12A1 so that a label 60 can be slid between bar 16 and base 12A. Bar 16 has, facing wall 12B3, a concave surface 14C configured to mate with the shape of lighter 50. This surface 14C is similar to and positioned facing surface 14B.

In this example, the thickness of intermediate wall 12B2 is different between bar 16 and lateral wall 12B3 and between bar 16 and lateral wall 12B1. In fact, inner surface 12B21 of the intermediate wall within second receptacle 14 is offset by a distance D relative to inner surface 12B22 of intermediate wall 12B2 between bar 16 and lateral wall 12B1. Surface 12B21 forms a stop surface to position lighter 60 within second receptacle 14. In fact, by positioning lighter 50 against this surface 12B21, the relative position of lighter 50 is adjusted with respect to first receptacle 12, and therefore with respect to label 60. Thus, in this example, surface 12B21 (as well as surfaces 14B and 14B*) permit lighter 50 to be positioned in a predetermined position with respect to first receptacle 12.

\* sic; surfaces 14B and 14C?—Translator's note

In this example, a second window 18 is formed between walls 12B1, 12B2 and bar 16, facing surface 12A1. Such a window 18 permits the user to easily handle and guide label 60 when it is introduced/removed from first receptacle 12.

FIG. 4 shows an example of a label usable in device 10. Label 60 is a self-stick label comprising two removable (i.e., peelable) protections 62A and 62B protecting the sticky part of the label. In this example, protection 62A has a rectangular shape like window 14A and a surface area of approximately 110% of the surface area of window 14A. In this example, window 14A has no material border on one side. Thus, generally, it is understood that the surface area of the opening arranged facing surface 12A1 and comprised strictly between the first part and the second part of second receptacle 14 is considered as the surface area of window 14A.

A method for manually applying a label onto a predetermined object will now be described with reference to FIGS. 5A to 7. This method implements device 10 described previously in order to apply a label 60 onto a lighter 50.

Figure 5A:
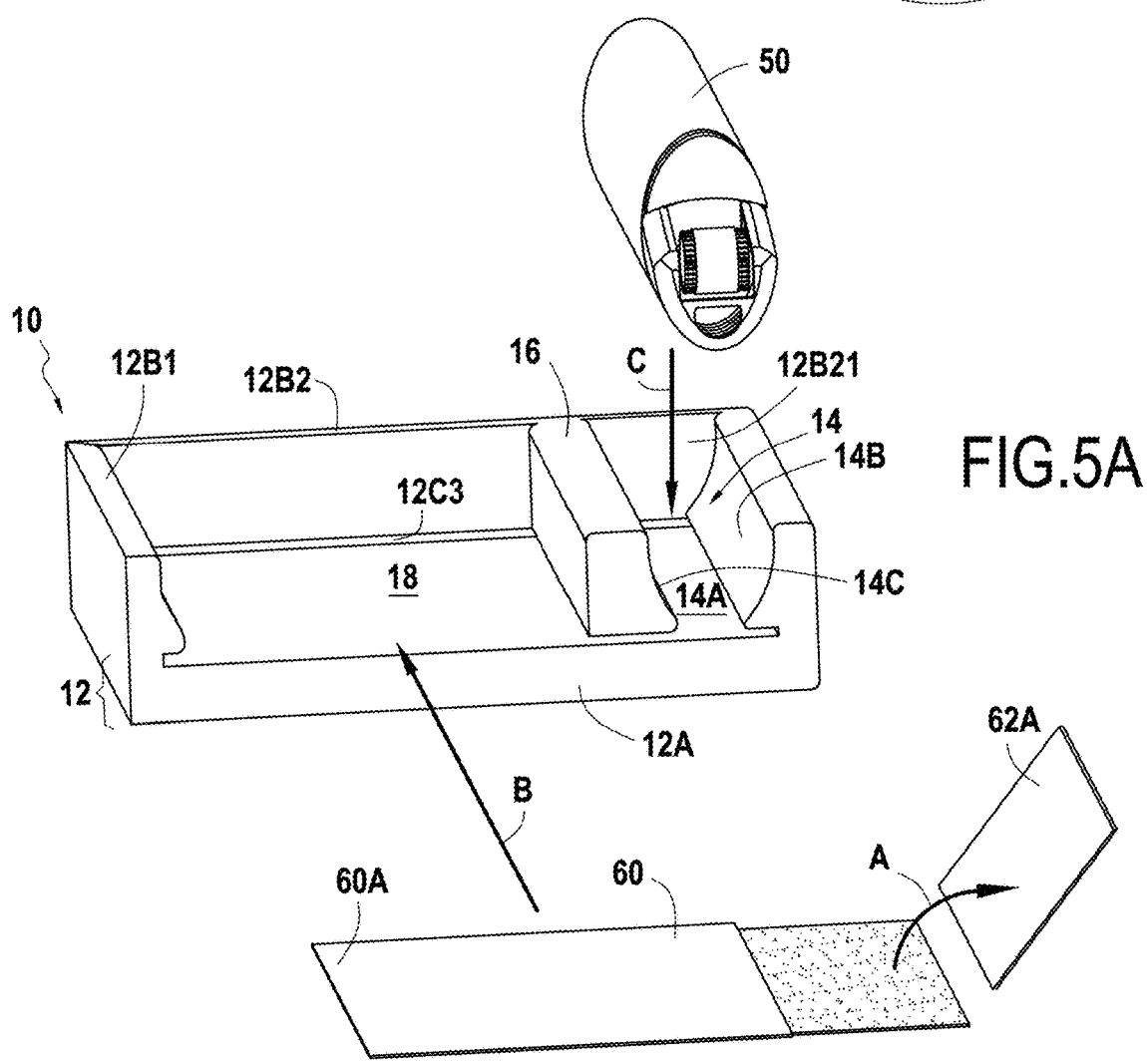
FIGS. 5A and 5B show the first steps for manually applying the label onto a predetermined object, using the device of FIG. 1 and the label of FIG. 4.
Figure 5B:
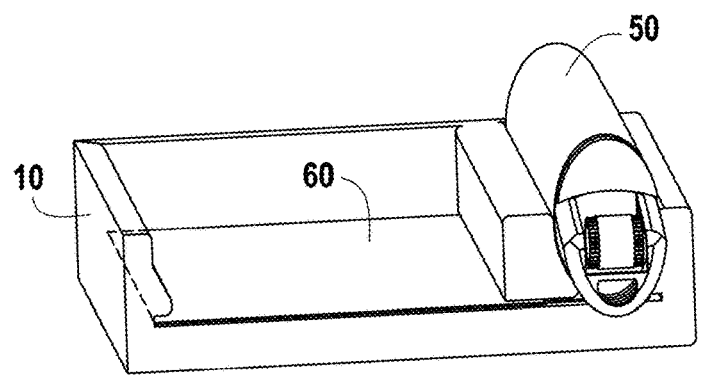

First, protection 62A is removed from label 60 (see arrow A in FIG. 5A); then label 60 is positioned in first receptacle 12 (see arrow B FIG. 5A). More particularly, in this example, border 60A of label 60 is slid into grooves 12C of first receptacle 12. During this operation, label 60 also slides between bar 16 and base 12A. The user can easily guide label 60 via second window 18 between bar 16 and lateral wall 12B1. When label 60 is stopped against bottom 12C3 of groove 12C of intermediate wall 12B2, label 60 is arranged in first receptacle 12. In this position, the glued part (or the sticky part) of label 60 is positioned facing window 14A. while label 60 rests on surface 12A1, which thus forms a support for label 60.

Next, lighter 50 is positioned in second receptacle 14. To do this, it is sufficient to place lighter 50 between bar 16 and lateral wall 12B3, onto surfaces 14B and 14C (see arrow C in FIG. 5A). During this step, the lighter is also placed against inner surface 12B21 of intermediate wall 12B2. Thus, lighter 50 is in a predetermined position with respect to first receptacle 12, and consequently with respect to label 60. In this position, lighter 50 contacts label 60 via window 14A (see FIG. 5B). Thus label 60 is partially applied to lighter 50.

Next, the assembly formed by lighter 50 and label 60 partially applied to lighter 50 is removed from device 10. To do so, label 60 is slid so that it comes out of grooves 12C (see arrow D FIG. 6).

Figure 6:
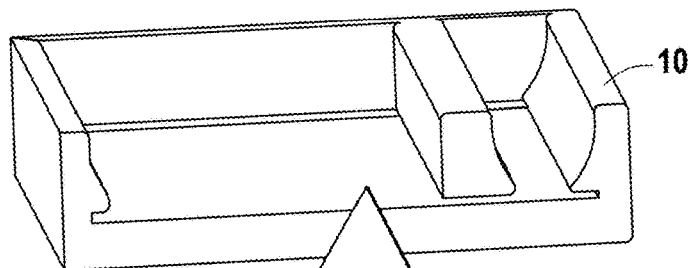
FIG. 6 shows the subsequent steps for manually applying the label onto a predetermined object.
Figure 7:
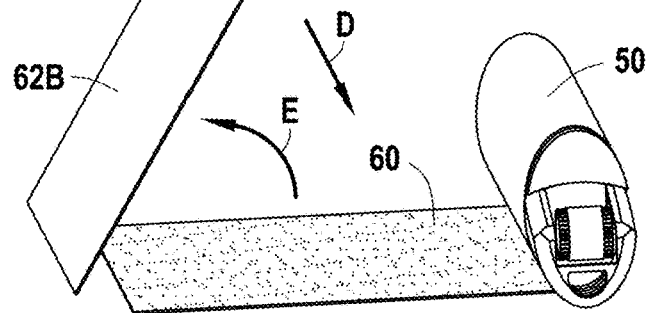
FIG. 7 shows the last step for manually applying the label onto a predetermined object.
Figure 7:
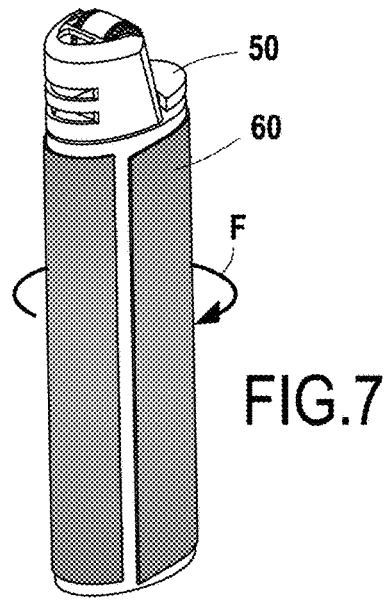

The second protection 62B of label 60 is then removed (see arrow E in FIG. 6). In order to finalize the application of label 50* onto lighter 50, label 60 is rolled around lighter 50 (see arrow F in FIG. 7). Since the first gluing of label 60 onto lighter 50 was produced perfectly during the step shown in FIG. 5B (i.e. lighter 50 and label 60 are perfectly aligned), this rolling is very simple since the final positioning of label 60 on lighter 50 corresponds to the planned alignment (i. e. in this example, the two edges of the label are aligned where they meet).

* sic; label 60?—Translator's note

Thus, a user can print a desired pattern on a fresh label, for example, and personalize one or more lighters.

In this example, label 60 is square. According to one variant that is not shown, the label may have any shape whatsoever, as long as it can be positioned in a certain and reproducible manner in first receptacle 12. For example, label 60 has a peelable positioning support of a shape adapted to first receptacle 12 (in this example, square shaped). By means of such a support, the label may be positioned in a dedicated place, reproducibly, within the first receptacle.

Although the present invention has been described by referring to specific exemplary embodiments, it is obvious that modifications and changes can be made to these examples without departing from the general scope of the invention as defined by the claims. In particular, the individual characteristics of the different embodiments illustrated/discussed may be combined into additional embodiments. Consequently, the description and drawings must be considered in an illustrative sense rather than a restrictive sense.

It is also obvious that all the characteristics described with reference to a method can be transposed, alone or in combination, to a device; and conversely, all the characteristics described in reference to a device can be transposed, alone or in combination, to a method.

The invention claimed is:

1. A device for manually applying a label onto a predetermined object comprising: a first receptacle configured to receive and retain a label and a second receptacle configured to receive and retain an object in a predetermined position with respect to the first receptacle, the second receptacle being adjacent to the first receptacle and having a window opening into the first receptacle so as to be able to apply the label in whole or in part on the object, wherein the first receptacle comprises a base having a label support surface, and at least one retaining element configured so as to limit the movement of the label relative to the label support surface, wherein the retaining element comprises at least one stop, the device comprising at least one groove adjacent to the label support surface, the groove having a bottom forming an angle with the label support surface, the bottom forming the stop.

2. The device according to claim 1, wherein the label support surface is square or rectangular, and wherein the groove is formed on three sides of the square or rectangle at the periphery of the label support surface.

3. The device according to claim 2, wherein each of the at least one groove is formed in a wall essentially perpendicular to surface.

4. The device according to claim 1, wherein the second receptacle comprises two parts configured to support the object, each part being configured to cooperate by complementarity of shape with the object.

5. The device according to claim 3, wherein the wall comprises three walls, and wherein the three walls has a first wall that forms one part while the other part is formed by a bar parallel to the first wall, said bar extending from one wall adjacent to the first wall.

6. The device according to claim 1, wherein the label is a self-stick label.

7. The device according to claim 6, wherein the self-stick label has two separate removable protections protecting the sticky surface of the label, one of the protections being of the same shape as the window and having a surface area comprised between 80% and 120% of the surface area of the window.

8. The device according to claim 1, wherein the object is cylindrical.

9. The device according to claim 2, wherein the label support surface is square or rectangular, wherein the groove is formed on three sides of the square or rectangle at the periphery of the label support surface, and wherein the second housing is configured to receive the object so that the axis of the cylindrical shape of the object is parallel to the groove that is formed on two of the three sides and perpendicular to the groove on a third side of the three sides, the second receptacle being open from a side of the surface lacking a groove.

10. A method for manually applying a label onto a predetermined object, comprising the steps of:
    providing the device according to claim 1;
    positioning the label in the first receptacle so that a sticky part of the label is positioned opposite the window of the second receptacle;
    positioning the object in the second receptacle, by the sticky part that is glued onto object;
    removing the object and the label from the device; and
    gluing the rest of the label onto the object.

* * * * *